Feb. 18, 1964     R. S. WILKES ETAL     3,121,568
MATERIAL UNLOADER
Original Filed Jan. 2, 1959     3 Sheets-Sheet 1
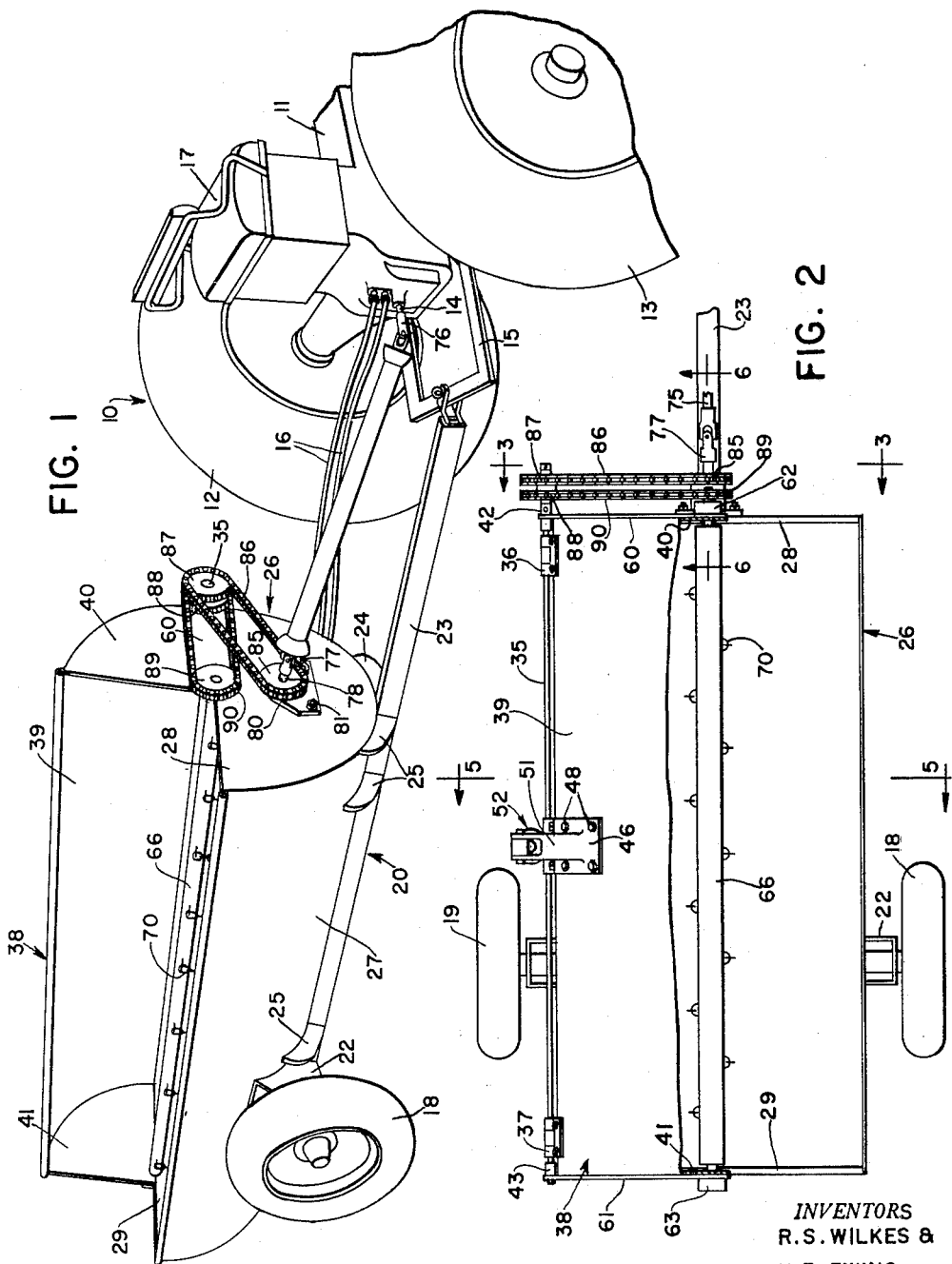
INVENTORS
R.S. WILKES &
K.F. EWING
ATTORNEYS

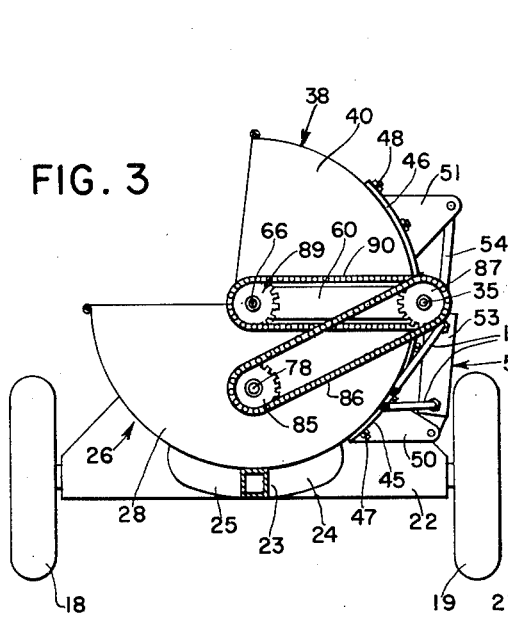
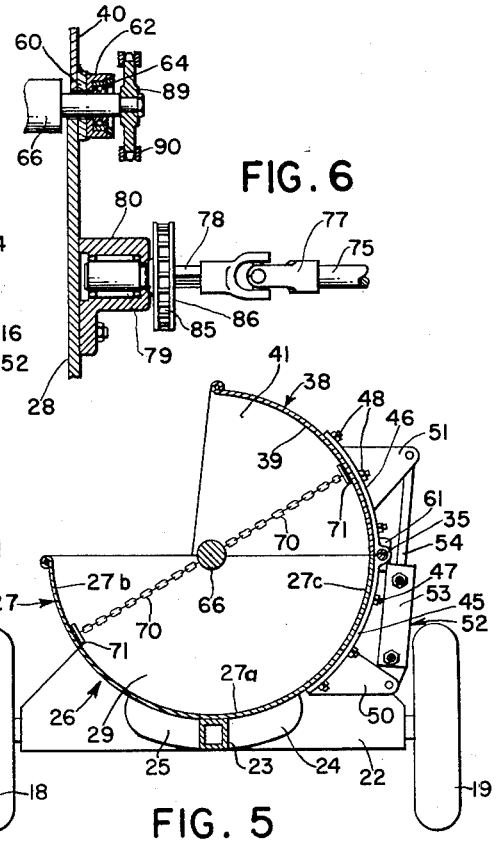
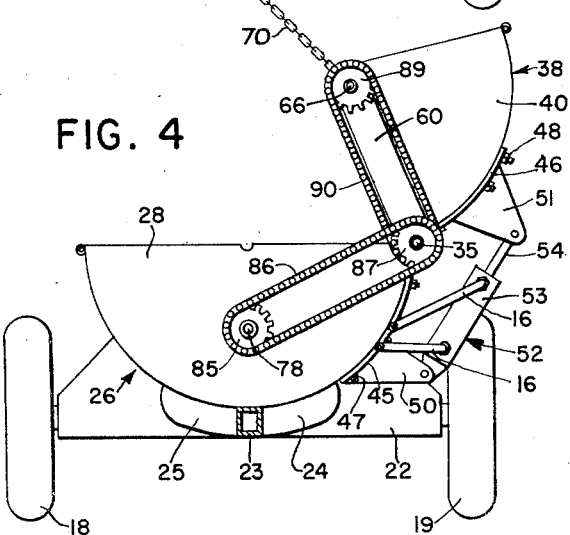

Feb. 18, 1964

R. S. WILKES ETAL 3,121,568

MATERIAL UNLOADER

Original Filed Jan. 2, 1959

INVENTORS
R. S. WILKES &
K. F. EWING
BY
ATTORNEYS

United States Patent Office

3,121,568
Patented Feb. 18, 1964

3,121,568
MATERIAL UNLOADER
Raymond S. Wilkes and Keith F. Ewing, Moline, Ill., assignors to Deere & Company, Moline, Ill., a corporation of Delaware
Continuation of application Ser. No. 784,580, Jan. 2, 1959. This application Nov. 1, 1961, Ser. No. 150,615
14 Claims. (Cl. 275—3)

This invention relates to a material unloading implement. More specifically this invention relates to an improvement in a material unloading structure shown and described in an application of Keith D. Elwick, Serial No. 663,074, filed June 3, 1957, now Patent No. 2,886,332, dated May 12, 1959.

This is a continuation of application Serial No. 784,580, filed January 2, 1959, and now abandoned.

In a material unloading structure there described, there is provided a main frame supporting an elongated material container having a partial cylinderical body. Supported on the container is a longitudinal shaft concentric with the axis of the cylindrical container. Axially spaced on the shaft are a series of flexible arms which operate, upon rotation of the shaft, to feed material over one side of the material container and onto the ground.

There are considerable advantages to the type of mechanism shown and described in the Elwick design. One of the primary advantages is that the flexible arms operate as beaters to completely pulverize material as it is discharged. Also of value is the simplicity of the unloading implement which reduces the overall manufacturing cost as well as the maintenance cost of the unit. Further, it has been found that the Elwick type of material unloader is more efficiently operating inasmuch as there is required only a single drive unit and only a single driven unit for the entire unloader.

One of the drawbacks of the aforementioned type of unloader is that by placing the flexible arm elements axially along the shaft so as to unload material throughout the container, there is normally a very large initial load on the power take-off shaft and, depending upon the type of material to be unloaded, there may be a considerably large load on the power take-off shaft throughout the operation. The large initial load on the shaft is caused by the power required to draw the flexible arms from an immobile state through the material. Since there are normally provided drags on the end of the flexible arms, a large resistance is caused by the material to initial movement of the flexible arms. It is therefore one of the main objects of this invention to provide a simple mechanism for reducing the initial load on the power take-off shaft as well as reducing the load on the shaft throughout its operation.

Specifically, it is proposed to mount the longitudinal shaft extending the length of the material container by means which may be moved relative to the walls of the container so that the arms on the shaft may be extended into the material in any amount desired by the operator. More specifically, it is proposed to adjust the longitudinally extending shaft vertically by means of a remote hydraulic cylinder which, upon full extension, will cause the flexible arms to be clear of the material. Therefore, by adjusting the remote cylinder, the extreme end of the arms may be extended into the material. Consequently, upon initial rotation of the shaft, there will be very little load on the shaft since only small end portions of the arms extend into the material. By vertical positioning of the shaft through operation of the hydraulic unit, the overall load on the shaft may be controlled by the operator. Should the material be of the nature which is extremely difficult to move from the container, the longitudinal shaft may be lowered slowly relative to the material thereby at no time creating a heavy load on the shaft.

In one form of the invention herein to be fully described, it is proposed to mount the longitudinal shaft on a lever structure which is pivotally mounted at one end and has its inner or opposite end positioned between the side walls of the container. The longitudinal shaft is mounted on the inner ends of the lever structure so that upon adjustment of the structure, the shaft may be moved vertically toward or away from the bottom wall of the container.

In a modification of the present invention it is proposed to extend opposite ends of the longitudinal shaft through slots in the end walls of the container. Guide and track means are provided on the end walls and shafts respectively. Remote hydraulic cylinders are then used to move the shaft longitudinally of the slots and relative to the walls of the container.

It is a further proposal in the present invention to provide with either form of the invention drive means which are automatically adjustable to accommodate vertical movement of the longitudinal shaft.

Other objects and advantages of the present invention will become apparent to those skilled in the art as the nature of the invention is better understood following the description as set forth in the specification and as shown in the accompanying drawings.

FIG. 1 is a front and side perspective of the material unloading implement and a rear portion of the tractor.

FIG. 2 is a plan view of the material unloading implement with portions broken away to show internal mechanism of the implement.

FIG. 3 is a sectional view taken substantially along the line 3—3 of FIG. 2.

FIG. 4 is a view similar to FIG. 3 showing a different position of the operating mechanism.

FIG. 5 is a sectional view taken substantially along the line 5—5 of FIG. 2.

FIG. 6 is a sectional view taken substantially along the line 6—6 of FIG. 2.

Figure 9:
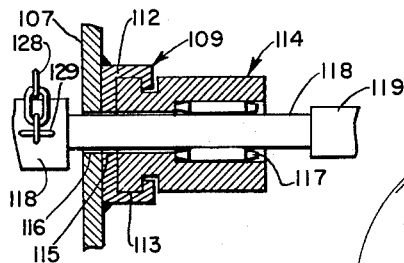
FIG. 9 is a sectional view taken substantially along the line 9—9 of FIG. 7.

Referring now to FIG. 1, the tractor 10 is of conventional design having an elongated body 11 supported at its forward end by steerable wheels, not shown, and at its rear by traction wheels 12, 13. The tractor 10 is characterized by having a conventional power take-off shaft 14 extending rearwardly from the tractor body 11 and a drawbar 15 fixed to the underside of the body 11. The tractor is operated from an operator's station indicated by the seat 17, with the control levers for operating the power take-off shaft 14 and other mechanisms of the tractor being available at that station. Hydraulic hoses 16 extend rearwardly from a hydraulic system, not shown, but contained in the body 11 of the tractor. The hydraulic system is one conventional in present day tractors.

The material unloader or manure spreader, includes an elongated main frame or chassis supported at its rear end by a pair of transport wheels 18, 19 mounted on a transverse axle structure 22. Extending forwardly from the axle structure 22 is an elongated channel member 23 having left and right hand arcuate shaped rib members 24, 25 respectively extending outwardly from opposite sides thereof. The ribs 24, 25 extend under and operate in conjunction with the channel member 23 to cradle or support an elongated fore-and-aft extending material containing body, indicated in its entirety by the reference numeral 26. As may be seen clearly in FIGS. 1–5, the material containing body 26 includes an elongated semi-cylindrical shaped portion 27 enclosed at opposite ends by end walls or plates 28, 29.

The cylindrical shell 27 may be treated as a U-shaped member having opposite side walls 27b, 27c connected by a bottom wall 27a. Positioned outwardly of and adjacent the upper edge of the side wall 27c is an elongated hinge pin or shaft 35 which extends the length of the container 26. Provided at opposite ends of the hinge pin or shaft 35 are a pair of hinges 36, 37, each hinge having one wing bolted to the side wall 27c and the other wing being bolted to an upper hood structure, indicated in its entirety by the reference numeral 38. The hood 38 includes therein an elongated fore-and-aft extending partial cylindrical portion 39 substantially coaxial with the cylindrical wall 27, and a pair of opposite end walls 40, 41 which serve as upper continuations of the end walls 28, 29. The walls 40, 41 have rigid therewith brace plates 60, 61 respectively, the latter having outwardly extending portions which support bearings or bosses 42, 43 which receive opposite ends of the shaft or pin 35. As will become apparent, from viewing FIG. 4, the shaft or pin 35 serves as a fore-and-aft extending pivot on which the upper hood or shield 38 may swing vertically.

Provided on the outer face of the hood 38 and the wall 27c are a pair of large arcuate shaped plates 45, 46 which are joined together by the shaft or pin 35 to in effect provide an enlarged hinge at the central portion of the shell 27 and hood 38. The arcuate shaped plates 45, 46 are fixed to the respective wall 27c and 39, respectively, by means of bolts 47, 48 respectively. Projecting outwardly from the arcuate shaped plates 45, 46 are a pair of bracket structures 50, 51. Extending between the brackets 50, 51 is a hydraulic unit 52 having a cylinder end 53 pivotally mounted to the lower bucket 50 and a ram end 54 pivotally mounted to the upper bracket 51. As may be seen clearly from viewing FIGS. 3 and 4, the hydraulic unit 52 operates as power means for causing the hood 38 to swing about the hinge pin or shaft 35. Consequently, the hood 38 may be raised or lowered from the operator's station on the seat by regulating the flow of fluid in the hydraulic hoses 16.

The outer ends of the braces 60, 61 support the bosses 42, 43, previously mentioned, and the inner ends of the braces 60, 61 support journal housings 62, 63 respectively. The forward journal housing carries therein bearings 64. The rear journal housing 63 supports a bearing, not shown, but similar in detail to that of bearing 64. Journaled in the bearings is an elongated shaft 66. Therefore, it will be clearly understood that the shaft 66 is carried by the hood member 38 and consequently may be raised or lowered relative to the lower cylindrical shell 27 by the hydraulic unit 52. The distance between the axes of the shafts 35 and 66 is substantially the radius of the cylindrical shell 27. The hood 38 and particularly the braces 60, 61 may be treated as lever structure for raising and lowering the shaft 66.

Mounted on the shaft 66 are a series of axially spaced apart flexible arms in the form of chains 70. Fixed to the outer end of the chains 70 are drag members 71. As will later become apparent, in operation, the chains 70 may wrap themselves around the shaft 66, or may extend themselves in a manner similar to that shown in FIG. 5 to a location whereby the drags 71 are extended substantially the radius of the cylindrical shells 27 and 38.

Drive mechanism for rotating the shaft 66 is taken directly from the power take-off shaft 14 of the tractor and includes a main telescoping type drive shaft 75 having universal joints 76, 77 at opposite ends thereof, the forward universal joint 76 being directly connected to the power take-off shaft 14 and the rear universal joint 77 being mounted on a short stub shaft 78 which is journaled in a bearing 79 contained in a bearing housing 80, bolted as at 81, to the front wall 28 of the container 26. Mounted on the shaft 78 is a pinion sprocket 85 over which is mounted a chain 86, which in turn drives a chain sprocket 87 rotatably mounted on the shaft 35. Integral with the sprocket 87 is a drive sprocket 88 which operates a second chain drive extending inwardly to the shaft 66. As may be seen in FIG. 6, the forward end of the shaft 66 has a sprocket 89 mounted thereon over which is mounted a drive chain 90, the opposite end of the chain 90 extending over the sprocket 88.

The first form of the invention as shown in FIGS. 1–6 will operate in the following manner. By operating the power take-off shaft so as to drive the shaft 66, the chains 70 will initially wrap themselves about the shaft 66, assuming, of course, that the material container is loaded with some form of material. Normally, the hydraulic unit 52 will be extended in the position shown in FIG. 3. However, should the material be of such substance that a large load is applied on the chain and shaft 66, so as to either slow down or completely stop the power take-off shaft, the hydraulic unit 52 may be retracted to a position shown in FIG. 4 of an intermediate position. Since the material in the container will normally fill only the container, the chains will become fully extended and contact only the upper surface of the material. Consequently, the initial load on the chains 70 and shaft 66 will be greatly reduced. As the material is cleared away by the rotating chains 70 and drags 71, the hydraulic unit 52 may be extended so as to gradually empty the container 26. Since the hydraulic unit 52 is controlled from the operator's station, the load on the tractor may therefore be controlled.

It will be noted, that by means of the present drive system in which the distances between the shafts 66—35 and shafts 35—78 remain constant regardless of the position of the hydraulic unit 52. Therefore, there is no adjustment required in the drive mechanism in order to accommodate movement of the shaft 66 toward or away from the bottom of the container 26.

Figure 7:
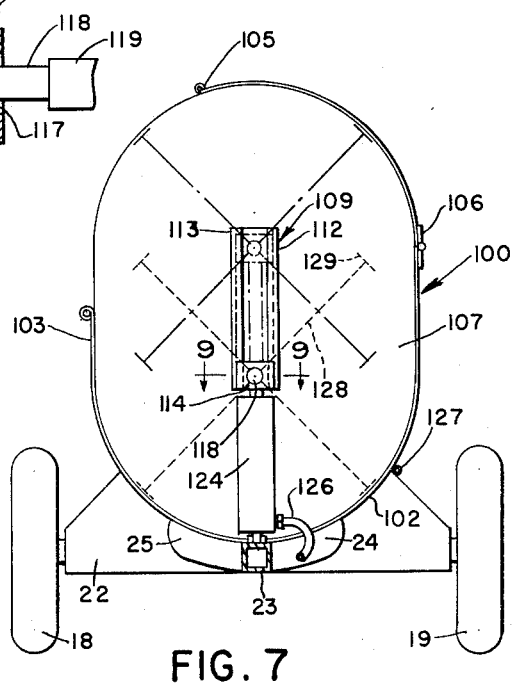
FIG. 7 is an end view of a modified form of the invention.
Figure 8:
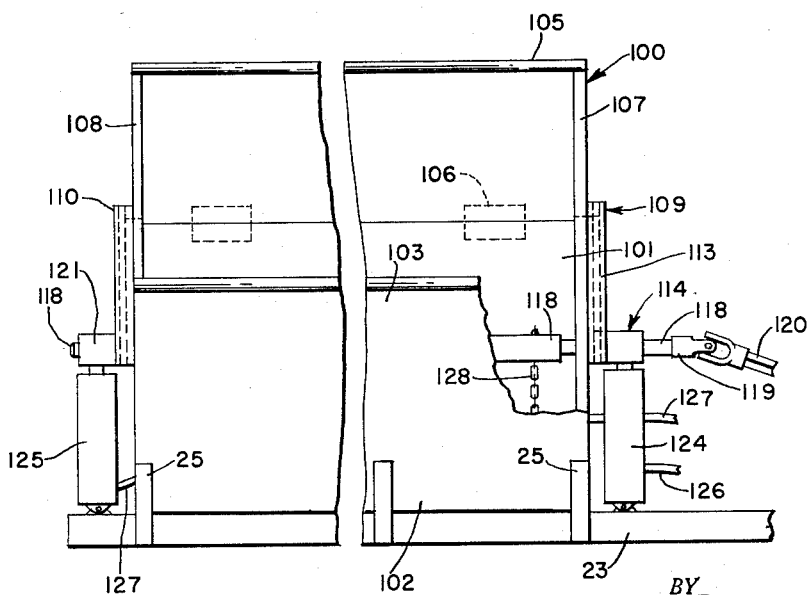
FIG. 8 is a side view of the modified form of the invention as shown in FIG. 7.

Referring now to the form of the invention shown in FIGS. 7, 8 there is therein provided a mobile frame or chassis, similar to that of the previous form, which features the axle structure 22 mounted on the supporting wheels 18, 19 and the forwardly extending channel member 23 with outwardly extending rib members 24, 25 which fit under and cradle the main material container here indicated in its entirety by the reference numeral 100. The container 100 is composed of an upright body having a lower rounded portion 102 with upwardly extending sides 101, 103 extending from the rounded portion. Also provided at the upper edge of the side wall 101 is a hood 105 which is hinged, as at 106, so that it may be swung back for loading the container with material. The container is closed at its front and rear ends by front and rear walls 107, 108. As may be clearly seen, the hood 108 extends over the upper portion of the container with the space between the edge of the hood 108 and the upper edge of the side wall 103 serving as a material discharge opening.

Fixed to the front wall 107 is a vertically disposed track 109. Similarly, fixed to the rear wall 108 is a similar vertically disposed track member 110. Referring specifically to FIG. 9, the track 109 is composed of a pair of C-shaped channels 112, 113 which enclose one end of a guide lock 114. The channels 112, 113 are spaced apart so as to form an upright slot 115 adjacent to the wall 107. In register with the slot 115 is a slot 116 cut in the wall 107. A guide block 114 carries a bearing 117 journaling the forward end of the shaft 118. The shaft 118 extends the length of the material container and has opposite ends thereof extending through the front and rear walls 107, 108. The slots 115, 116 at the forward end and similar ones, not shown, at the rear end accommodate vertical movement of the shaft 118. The extreme forward end of the shaft 118 is provided with universal joint 119 which is also connected to a conventional telescoping type drive shaft 120 extending forwardly to the power take-off shaft of a tractor. The rear end of the shaft 118 is supported in a guide lock 121 which is identical to the block 114 and moves vertically in the track 110.

Power means for moving the blocks 114, 121 vertically in the track 109, 110 is provided by means of a pair of hydraulic units 124, 125 which are mounted on the channel member 23 and are disposed vertically. The ram end of the hydraulic unit 124, 125 fit under the blocks 114, 121 and upon extension or retraction of the units 124, 125 the blocks 114, 121 will be moved vertically. Hydraulic hoses 126, 127 are connected to the hydraulic units and effect extension of the hydraulic units, retraction of the hydraulic units occurring due to the weight of the shaft 118 when the hydraulic pressure is released.

Mounted on the shaft 118 are a plurality of axially spaced apart chains 128 with drag members 129 mounted on the terminal ends of the chains.

In operation, the modified form of the invention shown in FIG. 7 lines is somewhat similar to that of the previous form. Normally, the hydraulic cylinders 124, 125 will be in the retracted position and the shaft 118 will be rotated in a counterclockwise direction, as viewed in FIG. 7, thereby causing the chains 128 and drags 129 to drive or throw the material out of the discharge opening between the edges of the plates 103, 105. In most operations, the material in the container will be of such substance that the load on the chains 128 and shaft 118 will be of a relatively small quantity so that the power take-off shaft on the tractor will operate without difficulty. However, in some instances, the load on the chains 128 and drags 129 will be of rather large quantity thereby offering large resistance to initial rotation of the shaft 118 and possibly rotation of the shaft 118 throughout the discharging operation. Upon the latter circumstances occurring, the hydraulic units 124, 125 will be extended in unison and the shaft 118 raised to a position in which only the ends of the chains 128 in their extended condition will reach the manure or other type of material. In this manner, the initial load on the shaft 118 will be considerably reduced and the rotation of the shaft 118 may be initiated without difficulty. Upon the shaft 118 having cleared the area adjacent the extended ends of the chains 128, the hydraulic units 124, 125 may then be retracted so that the chains 128 may clear the area next adjacent to that area previously cleared. As may be clearly understood, therefore, by systematic retraction of the hydraulic units 124, 125, the load on the shaft 118 may be controlled and consequently kept within the power output of the power take-off shaft on the tractor.

Another advantage of the latter modification is that upon loading lighter materials, the container may be filled throughout its height or to a height in which material will not gravitate out the discharge opening between the edges of the panels 103, 105. By raising or lowering the shaft 118, material may be removed from the container when it is entirely filled or only partially filled. Consequently, by moving the shaft into various positions within the container, the overall capacity of the container may be increased since the chains 128 may be adjusted relative to the walls of the container to clear material within the container.

While only one modification of the present invention has been shown, it should be recognized that other forms and modifications will occur to those skilled in the art. Therefore, it should be understood that while only two forms of the invention have been described for the purpose of clearly and concisely illustrating the principles, it is not the intention or purpose of such disclosure to narrow or limit the invention beyond the broad general concepts set forth in the appended claims.

What is claimed is:

1. A material unloading implement comprising: frame structure; an elongated material container rigidly supported by the structure having a pair of oppositely disposed side walls interconnected by a bottom wall; shaft means normally disposed between the side walls and above the connecting wall; radially extensible flail elements axially spaced on the shaft means; means mounting the shaft means on the frame structure, said latter means being adjustable to effect movement of the shaft means toward or away from the bottom wall; and drive means rotating the shaft means, said drive means being automatically adaptable to accommodate adjustment of the shaft means relative to the bottom wall.

2. A material unloading implement comprising: frame structure; an elongated material container rigidly supported by the structure having a pair of oppositely disposed side walls interconnected by a bottom wall; shaft means normally disposed between the side walls and above the connecting wall; radially extensible flail elements axially spaced on the shaft means; lever structure supported at one end of the frame structure and having a vertically swingable portion, means mounting the shaft means on said portion of the lever structure; power means on the frame structure for adjusting the lever structure vertically to effect movement of the shaft means toward or away from the bottom wall; and drive means rotating the shaft means, said drive means being automatically adaptable to accommodate adjustment of the shaft means relative to the bottom wall.

3. A material unloading implement comprising: frame structure; an elongated material container rigidly supported by the structure having a pair of oppositely disposed side walls interconnected by a bottom wall; shaft means; radially extensible flail elements axially spaced on the shaft means; lever structure supported at one end of the frame structure and having a swingable portion; means mounting the shaft means on said portion of the lever structure; power means on the frame structure for swinging the lever structure to effect movement of the shaft means toward and away from the walls of the container; and drive means rotating the shaft means, said drive means being automatically adaptable to accommodate adjustment of the shaft means.

4. The invention defined in claim 3 in which the container is of semi-cylindrical cross section and is closed at opposite ends by upright end walls, the lever structure is pivotally mounted about a longitudinal axis adjacent an upper edge of one of the side walls and extends inwardly therefrom toward the center of the container; the shaft means is mounted on a portion of the lever structure a distance substantially equal to the radius of the cylindrical container, and the radially extensible flail elements are substantially equal in their extended length to the radius of the cylindrical container.

5. The invention defined in claim 4 further characterized by a hood having a longitudinally disposed partial cylindrical portion continuing upwardly from said upper edge of the container wall and opposite end walls continuing upwardly from the end walls of the container, and the hood is fixed to the lever structure whereby movement of the lever structure will effect movement of the hood into and out of covering position relative to the container.

6. A material unloading implement comprising: frame structure; an elongated material container rigidly supported by the structure having a pair of opposite disposed side walls interconnected by a bottom wall; shaft means; radially extensible flail elements axially spaced on the shaft means; drive means rotating the shaft means for effecting discharge of material over a side of the container; means mounting the shaft means for support on the frame structure, and adjustable means effecting movement of the shaft means toward or away from the container walls.

7. The invention defined in claim 6 in which the container further includes oppositely disposed end walls, each having an elongated slot therein, the shaft means includes an elongated and longitudinally extending main shaft having opposite ends extending through the slots in the end walls, and the adjustable means includes hydraulic means connected to the shaft ends effecting movement of the shaft longitudinally of the slots.

8. A material unloading implement comprising: wall structure defining an upwardly opening elongated material container closed at opposite ends by end walls; longitudinal shaft means extending between the end walls; radially extensible flail elements axially spaced on the shaft means; means on the end walls supporting the shaft means and adjustable to move the shaft means toward or away from the wall structure defining the material container; and means for rotating the shaft means.

9. The invention defined in claim 8 in which the means supporting the shaft means on the end walls includes a track fixed to the respective end wall and a guide on the end of the shaft means adjacent the aforesaid wall engaging the track for movement along the track.

10. The invention defined in claim 9 further characterized by power operated means mounted on the end wall and connected to the guide for adjustably moving the guide along the track.

11. A material handling implement comprising: frame structure; an elongated material container rigidly supported by the structure having a pair of oppositely disposed side walls interconnected by a bottom wall; shaft means; radially extensible flail elements axially spaced on the shaft means; vertically movable structure on the frame structure; means mounting the shaft means on the movable structure; means supported by the frame structure adjusting the movable structure vertically to effect movement of the shaft means toward or away from the walls of the container; and drive means rotating the shaft means.

12. A material handling implement comprising: frame structure; an elongated material container rigidly supported by the structure having a pair of oppositely disposed side walls interconnected by a bottom wall; shaft means; radially extensible flail elements axially spaced on the shaft means; means supporting the shaft means for vertical movement relative to the container; means supported by the frame structure adjusting the shaft means vertically to effect movement of the shaft means toward or away from the walls of the container; and drive means rotating the shaft means.

13. A material handling implement comprising: frame structure; an elongated material container rigidly supported by the structure having a pair of oppositely disposed side walls interconnected by a bottom wall; shaft means normally disposed between the side walls and above the connecting wall; radially extensible flail elements axially spaced on the shaft means; means supporting the shaft means for movement relative to the container; means supported by the frame structure adjusting the shaft means to effect movement of the shaft means toward or away from the container and into and out of its normal disposition relative to the walls of the container; and drive means rotating the shaft means.

14. A material handling implement comprising: frame structure; an elongated material container rigidly supported by the structure having a pair of oppositely disposed side walls interconnected by a bottom wall; shaft means normally disposed between the side walls and above the connecting wall; radially extensible flail elements axially spaced on the shaft means; means supporting the shaft means for both lateral and vertical movement relative to the container; means supported by the frame structure adjusting the shaft means to effect movement of the shaft means toward or away from the container and into and out of its normal disposition in relation to the walls of the container; and drive means rotating the shaft means.

References Cited in the file of this patent

UNITED STATES PATENTS

| | | |
|---|---|---|
| 488,680 | Rix | Dec. 27, 1892 |
| 2,701,940 | Carr | Feb. 15, 1955 |
| 2,704,213 | Richey | Mar. 15, 1955 |
| 2,886,332 | Elwick | May 12, 1959 |
| 3,011,793 | McElhinney et al. | Dec. 5, 1961 |